April 12, 1960 G. F. SCHERER 2,932,311
PLUG VALVE IMPROVEMENTS
Filed Feb. 2, 1956 3 Sheets-Sheet 1
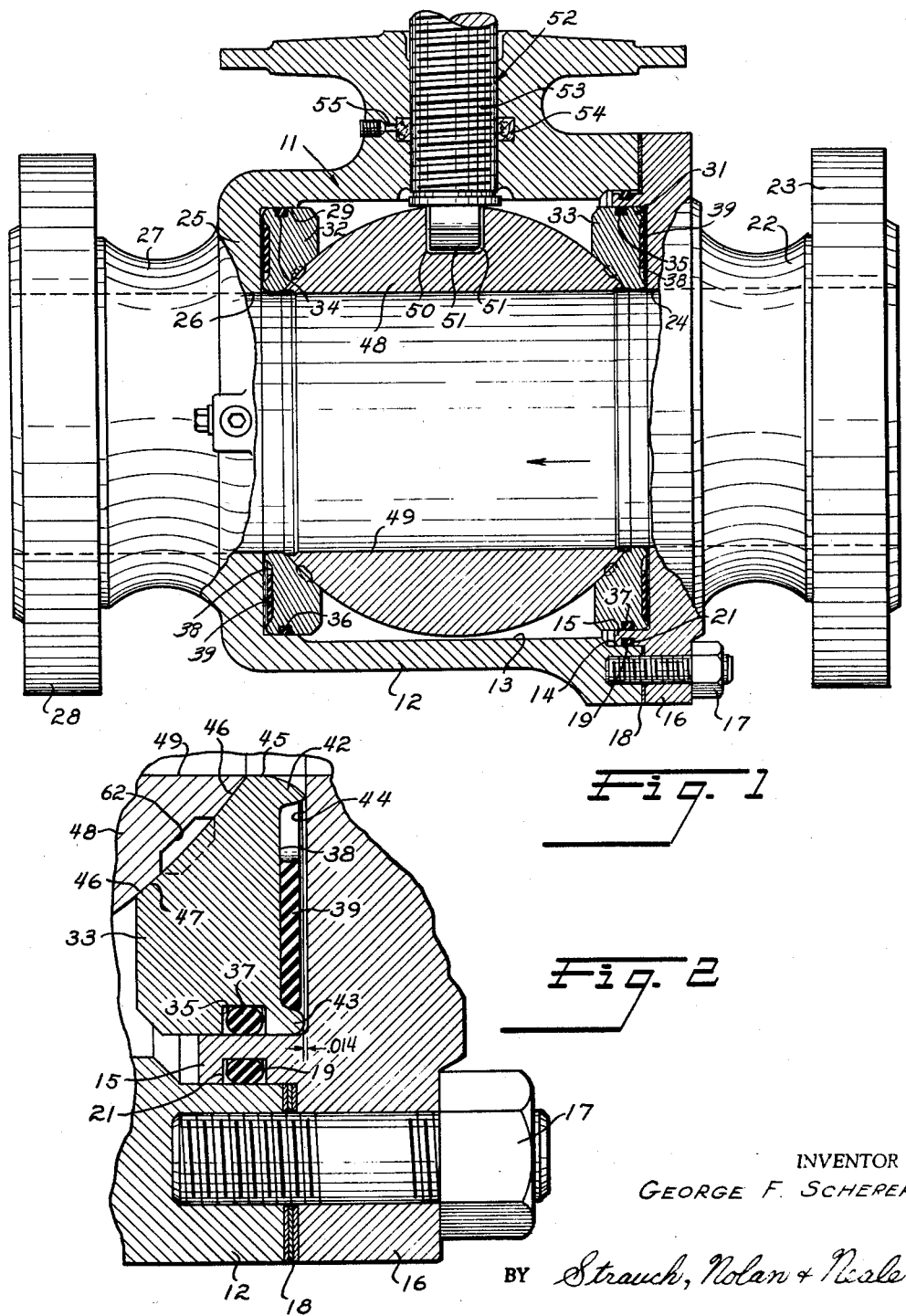
INVENTOR
GEORGE F. SCHERER
BY Strauch, Nolan & Neale
ATTORNEYS April 12, 1960 G. F. SCHERER 2,932,311
PLUG VALVE IMPROVEMENTS
Filed Feb. 2, 1956 3 Sheets-Sheet 2
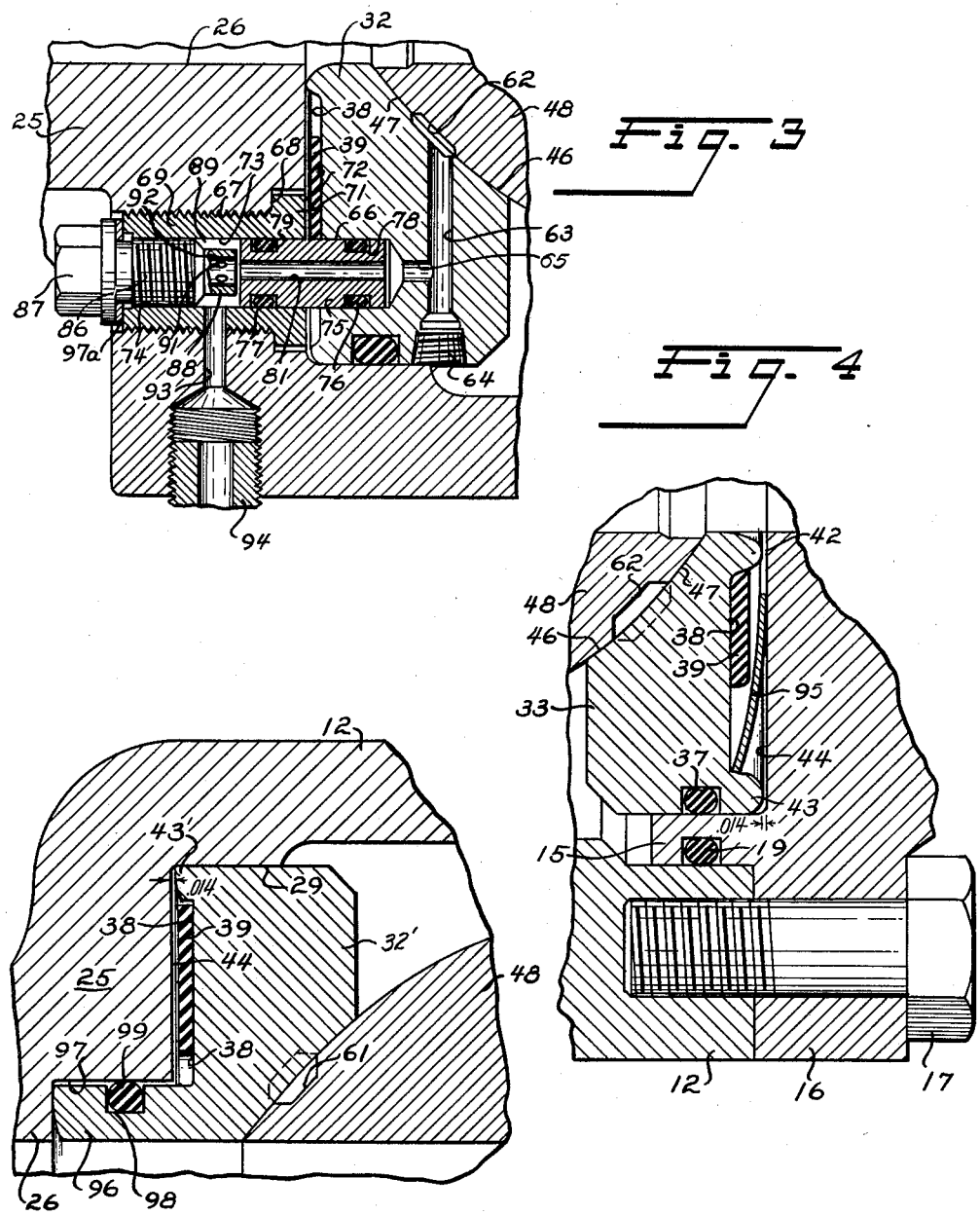
INVENTOR
GEORGE F. SCHERER
BY Strauch, Nolan + Neale
ATTORNEYS April 12, 1960 G. F. SCHERER 2,932,311
PLUG VALVE IMPROVEMENTS
Filed Feb. 2, 1956 3 Sheets-Sheet 3
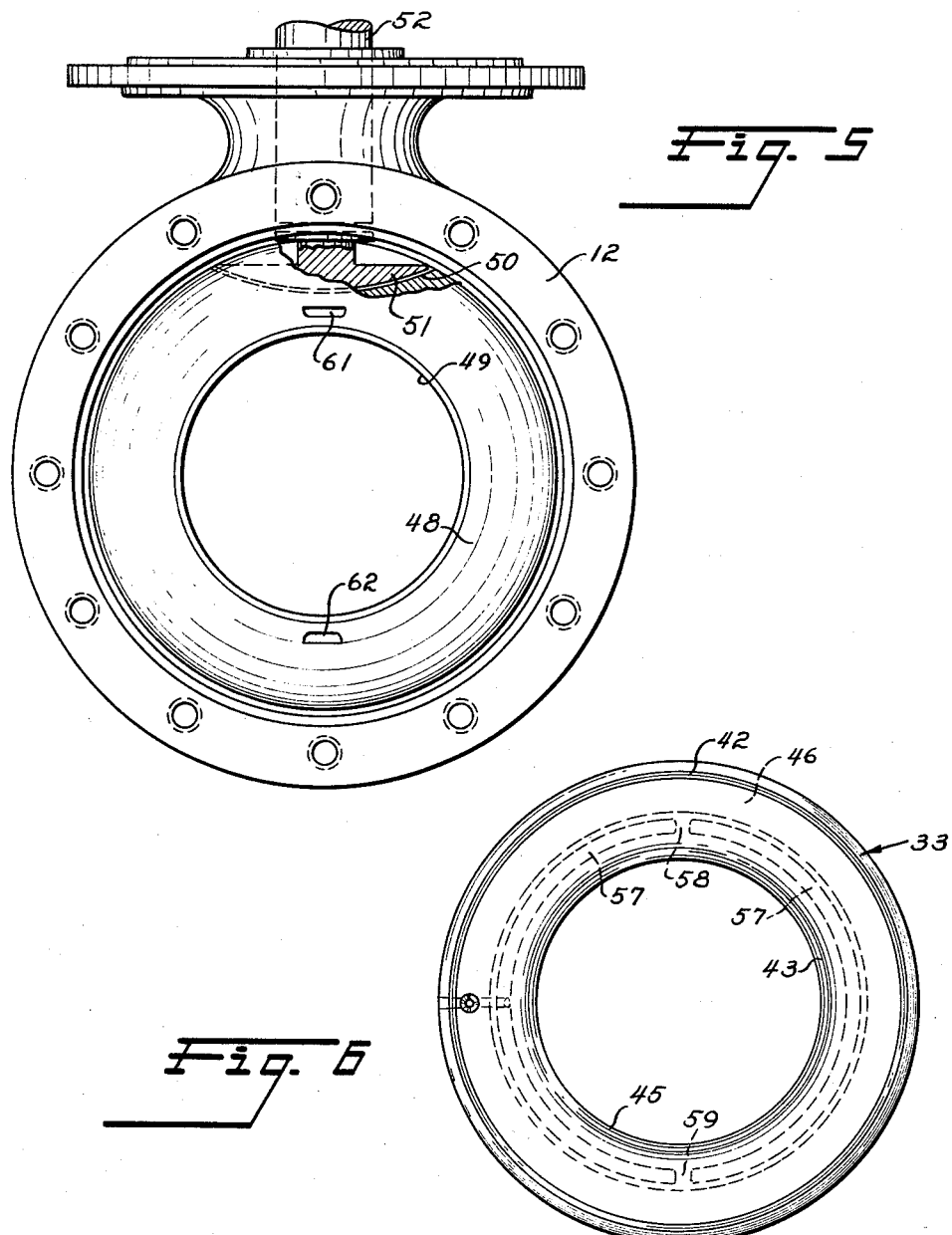
INVENTOR
GEORGE F. SCHERER
BY Strauch, Nolan & Neale
ATTORNEYS

United States Patent Office 2,932,311
Patented Apr. 12, 1960

2,932,311

PLUG VALVE IMPROVEMENTS

George F. Scherer, Oakland, Calif., assignor to Rockwell Manufacturing Company, Pittsburgh, Pa., a corporation of Pennsylvania Application February 2, 1956, Serial No. 563,022

10 Claims. (Cl. 137—246.22)

This invention relates to plug valves and is particularly directed to such valves wherein provision is made for supplying an adequate plastic film of sealing material to the seats between the plug and the valve body, and wherein provision may be made for jacking the plug from its seat through the medium of lubricant pressure.

The invention relates in a particular embodiment to two-way so-called ball type valves, in which the seating surfaces are the curved surfaces of a spherical zone, wherein provision is made to supply an adequate plastic film of sealing and lubricating material to the spherical zone seating surfaces between the valve seats and the ball, and wherein provision is made for separating the ball and seat rings in the body through the medium of generating increased pressure of the sealing material.

This is a continuation-in-part of Serial No. 283,879, filed April 23, 1952, now Patent No. 2,788,015, dated April 9, 1957. In an important phase of the present improvement, special seat ring construction is provided.

It is an important object of my invention to provide a novel sorber pad arrangement of general use in plug valves.

A further object of the invention is to provide a novel seat ring construction in ball plug type valves.

Further objects of the invention will become apparent as the invention proceeds in connection with the appended claims and the annexed drawings wherein:

Figure 1 is a side elevation chiefly in section of a ball plug valve incorporating the invention;

Figure 2 is an enlarged fragmentary section showing seat ring and sorber pad structure;

Figure 3 is an enlarged fragmentary section showing how lubricant is introduced between the seating surfaces of the valve;

Figure 4 is an enlarged fragmentary section showing a spring backed seat ring;

Figure 5 is a side elevation partially broken away and in section showing the ball plug;

Figure 6 is an end elevation of a seat ring;

Figure 7 is an enlarged fragmentary section showing a further embodiment of the seat ring.

As shown in Figure 1, the metal valve body 11 has cylindrical wall 12 provided with internal cylindrical surface 13 and annular pilot bore 14 for cylindrical locating shoulder 15 of tail piece flange 16 which is secured to body 11 as by studs 17. A suitable shim assembly 18 is used between the tail piece flange 16 and body 11 to provide and maintain suitable assembly contact between the valve seating surfaces when there is no line pressure in the valve or when the valve is in the open position. A sealing O-ring 19 is compressed in an annular groove 21 on the tail piece cylindrical locating extension 15 to provide a fluid tight seat with bore 14. The radial flange 16 is formed integrally on the tail piece or body end section 22 which also has an outer flange 23, for attachment of the valve to a pipe line, and a cylindrical flow passage 24.

End wall 25 of valve body 11 has a cylindrical passage 26, of the same size and co-axial with passage 24, which extends through integral body section 27 and a pipe attachment flange 28.

A cylindrical recess 29 is provided at the juncture of the valve body walls 12 and 25 and is co-axial with and of the same size as an oppositely disposed cylindrical recess 31 formed within the extension 15 of tail piece flange 16. Rigid metal valve seat rings 32 and 33 fit with sliding clearance into recesses 29 and 31, and have annular grooves 34 and 35 in their respective peripheries that contain elastic sealing O-rings 36 and 37 of normally circular cross section to effect a sliding frictionless fluid-tight seal with the cylindrical wall surfaces of recesses 29 and 31 and to permit small axial displacements of the seat rings relative to the valve body during operation of the valve. For ordinary temperature ranges O-rings 36 and 37 are preferably of oil resistant synthetic rubber which is suitable for most pipe line services. Where higher temperatures are encountered, rings of "Teflon," "silastic," or like plastics may be used.

Each of the seat rings 32 and 33 is provided with an annular, wide, shallow recess 38 on its back surface, as shown in Figure 1 and the detailed Figure 2, in which compressible and expansible sorber pads 39 of soft or sponge rubber or the like are mounted. The axially facing body end wall surfaces 44 of the valve body and tailpiece recesses 29 and 31 are flat, annular and perpendicular to the axis of passages 24 and 26. The rear surface of each seat ring is provided with inner and outer annular axially projecting hubs 42 and 43 that extend toward respective surfaces 44. The extremities of hubs 42 and 43 are preferably curved, as illustrated in Figure 2, adjacent the valve body end wall surfaces 44. It is an important aspect of the invention that the axial dimension of outer hub 43 is definitely shorter than the axial dimension of inner hub 42 by an amount dependent on the maximum space, between the ball and seat ring seating surfaces, desired for establishment of a lubricant film during jacking operation. The value of the maximum jacking lubricant space in turn is dependent upon the size of the valve, the grease gun lubricant pressure applied and the time allowed for lubricant injection. For example, in an eight inch ball valve of the invention a seat jacking clearance of 0.010 inch has been found satisfactory. To obtain the exemplary clearance of 0.010 inch between the seat ring and ball seating surfaces which, as seen in the section view of Figure 1, are disposed at approximately a 45° angle relative to the axis of the valve flow passage, the seat ring must be permitted to be moved axially an amount equal to $$\frac{0.01}{\sin 45°} = 0.014 \text{ (approximately)}$$

This value is derived by using the basic trigonometric formula of $$\sin B = \frac{b}{c}; \quad c = \frac{b}{\sin B}$$

wherein $c$ is the axial distance that the seat ring must move to obtain a seat clearance equal to $b$, and wherein the approximate angle that the seating surfaces makes with the flow path through the valve bore is equal to B.

As will be fully described in the section of this specification devoted to operation, when the valve is assembled and under static conditions, there is an abutment contact between the inner hubs 42 of seat rings 32 and 33 and the radially inner portion of the body end walls 44. As the seat rings are rigid and do not deflect, the separation between the ball and ring seat surfaces, resulting from lubricant jacking, causes an elastic deformation of the associated body end wall until the outer hub 43 of the jacked seat ring abuts the radially outer portion of body end wall surface 44. In Figure 2 this deformation will occur until the 0.014 inch clearance between the seat ring and outer hub 43 and the end wall surface 44 of body recess 29 or 31 is taken up, at which position there will be a clearance of approximately 0.010 inch between the ball seating surfaces.

It will be observed that the sorber pads 39 preferably do not entirely fill the seat ring recesses 38. This feature permits a small clearance between the end wall surface 44 of the body recesses 29 and 31 and the exposed surfaces of the sorber pads to allow space for line fluid under pressure. Silt, sand, etc., may collect or pack between the back of the seat ring and the valve body, primarily behind the upstream seat ring and particularly in mud and similar surfaces. The sorber pad will yieldably absorb grains of sand, steel cuttings, scale, etc. forced against it under high pressures. Only particles less than .014 inch in diameter can enter this space. Hence the clearance, aforementioned, to enable the high pressure fluid to work on the face of the sorber pad and force all foreign materials against and into the pad.

Bores 45 of seat rings 32 and 33 are cylindrical, coaxial with, and of the same size, as opening 26. Rings 32 and 33 are provided with annular spherically curved seating surfaces 46 for the spherically curved annular mating surfaces 47 of ball plug 48, which is provided with cylindrical port 49 at least as large as passages 24 and 26. In practice, the unit seating pressures employed or the diametrical ratios of ball plug to port orifice may be varied depending upon the line pressures and valve sizes. In the embodiment of my invention illustrated and for general use, a ratio of 1.7 to 1.0 for the ball to port diameter is used. However, ratios of as high as 3.0 to 1.0 or more, or as low as 1.5 to 1.0 or less, may be desirable depending upon the valve sizes, line pressures, and operating torque desired. I have also found that a seat area to port area ratio providing a unit seating load of about 1450 pounds per square inch in 4-inch and 8-inch valves built for handling line pressures of 2000 pounds per square inch or thereabout, keeps the operating torque down to a highly satisfactory value.

The upper end of plug 48 is arcuately slotted at 50 to freely receive a mating arcuate surfaced tang 51 on the bottom of a valve stem 52 which is rotatably mounted in the valve body as by a running thread engagement at 53. Annular chamber 54 surrounds the valve stem for admission of a plastic sealing material under pressure through radial passage 55 to pack the stem in the well known manner. Any other suitable packed operating stem construction may, however, be used as will be apparent to those skilled in the art.

As illustrated in Figure 1, tang 51 is narrower than slot 50 and has sufficient clearance 56 in the slot to permit desired limited movement of plug 48 during operation. Referring to Figure 5, it will be noted that tang 51 is of considerable length within slot 50. This long tang and its provided clearance in the slot permits any desired limited controlled rotation and displacement of the plug with respect to the center line of the valve casing, either normal to or in the direction of line of flow, thus providing for proper seating of the plug and alignment of the lubricant and sealant grooves in the seats with the connecting lubricant grooves in the plug now to be described.

Also I may use a small centering pin arrangement between the plug and the stem for preventing undue radial relation of the ball plug around its axis but permitting ample play for maintaining its floating characteristics between the seats. Any other suitable connection permitting the required movements of the plug with relation to the operating stem may be utilized.

Tang 51 as shown is so positioned that the required axial movement of the plug is provided for by the clearance between the arcuate bottom of the tang and the complementary arcuate plug slot surface. If the tang position is changed by 90° with relation to the flow direction through the plug, the axial movement is then provided by the side play.

As illustrated in Fig. 6, each valve seat surface 46 is formed with shallow lubricant grooves 57 of substantially uniform depth interrupted by diametrically spaced lands 58 and 59. The surface of plug 48 is provided with short grooves 61 and 62 long enough to bridge the lands 58 and 59 in fully open and fully closed positions of the ball, which positions are 90° apart and determined by suitable co-acting stops (not shown) on the stem and valve body. When the lands are so bridged by the short grooves, grooves 57 become effectively continuous about the ball on opposite sides thereof.

Grooves 57 are adapted to receive a plastic sealing material which also lubricates the plug for turning movement and provides a hydraulic force for jacking the plug and seats axially apart. The amount of hydraulic jacking force required is provided by the area of the lubricant grooves multiplied by the unit fluid pressure exerted on the plastic lubricant and this in turn divided by approximately 1.40 to give the axial component of the jacking force. Thus either the groove area or the unit pressure of the lubricant may be varied as desired.

As illustrated in Figure 3, seat rings 32 and 33 are each provided with radial passage 63 communicating with groove 57 and closed at its outer end by a threaded plug 64. Cross passage 65 in the ring intersects passage 63 and is enlarged at its outer end to provide a bore 66. A still further enlarged threaded bore 67 is formed in body wall 25 co-axial with passage 65 and is enlarged at its inner end to provide a shoulder 68. Hollow sleeve 69 is externally threaded to fit into bore 67 and has an enlarged head 71 within shoulder 68 so that in the position of Figure 3 the flat smooth head surface 72 of the sleeve substantially fills the recess and is a substantial continuation of inner face of wall 25.

Sleeve 69 has a through axial bore with an inner smooth walled section 73 co-axial with and of the same size as bore 66, and an outer threaded bore section 74. A cylindrical conduit 75 extends between a sleeve 69 and the adjacent seat ring 32 and 33 with its opposite ends snugly but slidably received in bores 66 and 73. Sealing O-rings 76 and 77 compress in annular grooves 78 and 79 provided adjacent each end of a conduit 75 seal the periphery of the conduit member fluid tight with bores 66 and 73, respectively. In practice I have found it satisfactory to provide conduit member 75 with a slide fit radial clearance of about 0.005" with the bores, although satisfactory seals have been obtained with a radial clearance of 0.010", which may be necessary in manufacturing very large valves. Conduit member 75, with the O-rings in place in the grooves, is easily and simply assembled by being inserted through bore 73 into bore 66. Since the annular grooves 78 and 79 are equidistant from the ends of the conduit member, it is not material which end is inserted first. Conduit 75 also functions to properly locate seat rings 32 and 33 circumferentially and to prevent rotation of the seat rings in their bores relative to the body, which would result in displacement of the seat ring lands 58 and 59 away from proper relationship with the ball grooves 61 and 62. This arrangement also provides for removing or reinserting the conduit member if desired for inspection or replacement of the O-rings without disassembling the entire valve.

Central passage 81 is formed in conduit member 75 co-axial with the seat ring passage 65. A closure plug 86 having a hexagonal head 87 is threaded into bore 74 and is so formed that when drawn tight against its sealing gasket 97a, its inner reduced end 88 does not engage the end of conduit member 75 but provides sufficient clearance at its ends to permit the necessary axial movement of the seat ring 32 or 33 in operation without malfunctioning of the O-rings 76 and 77. Between the closure plug 86 and conduit member 75 an annular chamber 89 is thus provided which communicates with passage 81 directly and by radial openings 91 and axial passage 92 in the plug end. A passage 93, formed in a boss on the valve body wall 25, has a threaded outer end in which is mounted a suitable lubrication introduction fitting 94 to which a pressure gun or other means for introducing lubricant under pressure may be applied to place the lubricant under pressure and supply lubricant under pressure to the passages between plug 48 and its seats 46 to separate the plug and its seats 32 and 33 and provide lubrication for turning of the valve in its seats. Thus seat ring grooves 57 may be filled with lubricant under pressure through passage 93, chamber 89, openings 91, and passages 92, 81, 65 and 63.

The illustrated valve is assembled by introducing seat ring 32 through the open end of the body and then dropping or lowering the ball 48 in place on the seat ring 32. Tail piece 22 is then secured over the end of the body with seat ring 33 in place with a shim pack assembly 18, placed between the tail piece flange 16 and body 11, of sufficient thickness to provide initial contact between the spherical surfaces of the ball and seat rings and contact between inner seat ring hubs 42 and body end wall surfaces 44 where body resilience is relied upon and used to maintain seating surface contact. No shims are used where internal springs are employed as in Figure 4.

Operation

Assuming for illustration that the direction of flow is as indicated by the arrow in Figure 1, and the valve is closed or rotated 90° from the Figure 1 position, the full line pressure bears on the plug and urges it against the downstream seat ring 32, and a controlled slight extension between the seat abutments results, due to the inherent resilience provided by the valve body. The line pressure also urges the upstream seat ring 33 into tight surface engagement with the plug. This displacement of the upstream seat does not interfere with the lubricant distribution to the seating surfaces due to the slidable functioning of the conduit 75 in the lubricating mechanism of Figure 3. Thus in my improved valves the axially slidable upstream seat always follows the valve plug and insures constant mating contact of both upstream and downstream seating surfaces 46 with the plug surface 47, regardless of the direction of flow, when in the closed position. In the open position, without a differential line pressure on the plug, the seats are in mating contact as a result of the initial assembly procedure or through the internal springs of Figure 4. Accordingly, continuous protection of the seating surfaces not heretofore attained in lubricated plug cocks is provided. This likewise provides double sealing shut-off on both upstream and downsteram seats at the same time.

In the open position of the valve there is no appreciable axial elongation of the cylindrical body 12 due to line pressure. However the body design is such as to yield sufficiently to permit provision of an adequate lubricant film when under jacking pressures. In the closed position of the valve some axial elongation occurs due to holding back the mass of fluid, the effect of which is to separate the base of the upstream seat ring from its abutment, and, therefore, when jacking either seat ring from the plug the aforesaid separation is lessened without further elongation of the body, if the valve is under high line fluid pressure. I have found that the body of an 8-inch valve of the described construction when subjected to line pressure of 1500 pounds per square inch elongates axially about 0.010 inch over-all when in the shut-off position. When in the open position the axial elongation was not over 0.001 inch. While the essential body contours should theoretically approach the spherical for providing maximum strength with minimum weight or cost, I have found it desirable to employ an essentially cylindrical body in certain instances, as shown, in order to provide satisfactory amounts of yielding means axially without an undue amount of such body elongation which would require unduly long lubricant injector pins for transmitting lubricant through the movable seats. This construction varies with the size of valve and pressure rating which it is desired to handle.

The thrust load of the seat rings may be distributed over the total base area of the seat or relatively concentrated upon the inner or the outer portions of the seat. If the load is essentially absorbed on the outer portion of the seat adjacent the body cylindrical wall, the thrust load is absorbed entirely by shear stress in the body at the abutment between seat ring and the cylindrical body wall. If the thrust load is absorbed essentially at the inner portion of the seat ring, the load is absorbed as a bending moment in the body shoulder supporting the seat ring abutment. Referring to Figure 2 it will be noted that as a result of initial assembly the inner hub 42 is normally in contact with surface 44 and outer hub 43 is spaced about 0.014" from that surface as hereinbefore described. However when lubricant under pressure is introduced between the spherical seating surfaces at 46, 48 the separation of the seat ring from the body results in the axial forces being concentrated upon the radially inner portion of the body end wall 44 by contact with seat ring hub 42 until, by virtue of its resilience, the body deforms and then the load due to jacking pressures is mainly shifted to the region of contact between the outer seat ring hub 43 and the radially outer portion of body end wall 44 which due to body deformation is now in contact with the seat ring hub 43. In the generally cylindrical body, as shown, essentially all of the yielding means normally tending to keep both seat rings in spherical surface contact with the ball is provided in the bending action of the body end shoulders which support seat rings 32 and 33. The construction employed in which the thrust load on the body shoulders is transferred from the inner to the outer peripheries of the seat rings preserves the desired seat ring rigidity and controls the amount of bending in the body shoulders. This construction thus provides a limit to the total separation of the spherical seating surfaces 45 and 46 and thus provides a means for more efficient spread of lubricant over the seating surfaces by permitting lubricant pressure to build up in this area and thus cover the entire seating surfaces before exiting into the line or the valve body. This is particularly important where low viscosity lubricants are used and also where high viscosity lubricants are injected at a very fast rate under very high gun pressures.

The ball plug may be a full floating member of the valve ensemble and positioned only by the upstream and downstream seats of the valve. In the preferred embodiment of my present invention, as illustrated, not only is the ball plug positioned by the seats but by virtue of the construction employed, the floating seats are both in constant and uniform seating engagement with the plug at all times either in the open or closed position of the valve and with the differential line pressure being exerted in either direction of flow with the consequent deformations of the body. This is a great advantage in maintaining the seating surfaces in good condition since they are thus protected from entry of line fluid between the spherical seating and sealing surfaces which may corrode or erode these important areas or deposit extraneous material such as hard gritty particles thereon and result in increased operating torque.

The provision of the initial clearance at hub 43 is particularly important for the adequate lubrication of the valve in open position, and in some small valves, where there is no provision for resilient seating pressures as by holding the seats against the ball by body resilience, the inner hub 42 should also have an initial clearance and resilience provided by backing springs. It may also be desirable in some larger valves, for manufacturing or other reasons, to rely upon internal springs rather than body resilience for effecting contact between the seating surfaces of the two seat rings and the ball plug, yet permitting slight axial play for purposes of jacking. Such a resilient backing spring embodiment is illustrated in Figure 4. In this form of the invention an internal limiting clearance is provided between seal ring hubs 42 and 43 and the body seating abutment end wall 44, dependent upon the maximum lubricant space allowed between the seating surfaces during jacking operation. In an eight inch ball valve the preferred limiting clearance as shown is 0.014 inch. This provides for a limited maximum ball and ring seating surface clearance of about 0.010 inch at each seat. The resilience for jacking is provided by a suitable internal spring, as for example the Belleville spring 95 rather than by body resilience as in the embodiment of Figure 2. Also in this embodiment the seat hubs 42 and 43 are spaced with equal clearance from the body abutment end wall 44. This limits the separation of the ball from its seat during jacking to the desired amount solely to the internal spring deflection rather than to a function of the resilient bending and limiting body shoulder 34 which is relied upon in the embodiment of Figure 2. During assembly of the valve the ball is disposed between the spring-backed seat rings, and the clearances are such that the springs are compressed or preloaded as the tailpiece is bolted to the valve body and that adequate clearances remain after preloading to permit the required seat ring displacement during jacking. Thus, in the assembly, both seat rings remain in constant contact with the ball at all times, and the preloaded seat springs equally urge the seat rings against the ball when the valve is open and when the valve is closed so that the seat rings and ball move together under differential line pressure the preloaded upstream spring expands to maintain that contact. In this case axial body elongation takes no part in the functioning of the seating surfaces during establishment of the lubricant film by jacking apart of the seating surfaces.

In a further embodiment, illustrated in Figure 7, the seat ring 32' is formed with the usual recess 38 opposite flat body end wall 44, but here the ring is formed with an integral annular extension 96 of reduced external diameter that projects into an annular recess 97 formed about the inner end of passage 26 (and 24). Here, instead of the sealing O-ring being mounted on the external periphery of the seat ring, the extension 96 is peripherally grooved at 98 to receive a rubber or the like O-ring 99 compressed between extension 96 and the wall of recess 97. An advantage of this arrangement over that of Figure 2 is that I may use a smaller O-ring and obtain an equivalent seal. Further, the provision of a smaller O-ring reduces the seating pressure of the upstream seat ring on the ball due to line pressure in a valve closed condition and thereby reduces the torque needed to turn the ball in operation by virtue of the lesser area of the seat upstream line pressure which of course is added to the frictional resistance of the downstream seat.

When the seat ring 32' of Figure 7 is used, the ends of seat ring extensions 96 will contact the end walls of the radially inner body recesses 97. In this position the outer hub 43' of the seat ring will be positioned with a predetermined small clearance from the body end wall 44. This small clearance, approximately 0.014 inch, in an exemplary 8" valve, serves the same purpose as the clearance described for hub 43 of seat rings 33 in Figure 2, permitting lubricant space between the seat ring and ball seating surfaces, when jacking, to be realized by inherent valve body resilience.

The seat ring axial extension 96 has an end curvature, clearly shown in Figure 7, that primarily provides a graduated seating contact in proportion to the seating to offset the increased resistance to resilient body end wall deflection. This feature occurs because the end wall of body recess 97 assumes a slight inclination as the valve body deflects due to pressure and the slight inclination causes the annular contact between the seat ring extension 96 and the end wall of recess 97, in actuality, to roll radially outward a slight amount thus obtaining an increase in the amount of line contact between the extension and the end wall. When the valve body end wall has flexed to a point where hub 43 has taken up the clearance and engages the body end wall 44, seat ring thrust is transferred to a sheer stress in the body instead of a bending stress in the body end wall. This end curvature also functions to prevent accumulation of foreign matter on a flat seat and tends to force foreign articles out of the space between the end of extension 96 and the end wall of recess 97 and into the flow passage because resilient flexure of the recess end wall causes a squeezing action in the tapered gap between the end curvature of extension 96 and the end wall surface of recess 97.

In the ball valve embodiments of Figures 2–7, as foreign matter tends to collect in the recess 38, the sorber pad is compressed by line fluid entering the recess 38 which serves to imbed and thereby absorb solid metal particles, fine silt and like foreign particles from the line fluid that are trapped between the back of the seat ring and the body wall.

Any build-up of solid particles or caked material between the sorber pads and the adjacent body wall causes the sorber pads to be compressed to a degree by line fluid pressure. When additional pressure is applied, as by means of lubricant pressure between the seats for jacking the ball and seat ring surfaces apart, foreign material trapped or caked between the back surface of the pad of the seat ring which is being moved away from the ball and the associated recess end wall will cause that pad to be further compressed under this additional pressure. When jacking pressures are relieved the pad will be under line fluid pressure only and will re-expand to return to original volume under that pressure. This expanding action embeds in the pad foreign particles which will not flush out during operation. By constructing the pads of such dimension as to leave a clearance between the pads and the body end wall, a layer of foreign particles can build up on the pad surface with subsequent pressure causing the foregoing action. These sorber pads provide a resilient volume between the seal rings and body that enables much higher, trouble free, operational valve life.

During operation when the valve is in shut off position wherein the ball is rotated 90° with respect to the illustrated Figure 1 position, the valve body is axially stretched due to the line fluid pressure acting directly against the closed ball surface and pushing the ball toward the downstream seat. The line fluid pressure also gets behind the upstream seat ring and forces it against the ball surface. The force against the seat ring is much less than the force exerted against the ball because of the difference in exposed areas. This permits particles of sand, silt, scale and the like to accumulate between the back of the upstream seat ring and the adjacent axially facing body wall which in time forms a solid cake that will oppose relative axial movement of the seat ring and body in one direction. This solid cake forms in the seat ring recess 38 and partially compresses the pad 39 under line pressure.

Now when the valve is opened the force of the line pressure on the ball tending to stretch the body is removed and the body resiliently tries to return to its non-stretched condition, which thus closes the space between the upstream seat ring and the body. In the structure of the invention since the force of this return of the body is many times greater than the force which partially compressed the pad, the pad 39 is consequently further compressed under this action, the solid cake merely moving deeper into recess 38 rather than preventing elastic return of the body.

When the valve is again closed the relieved pressure permits the sorber pad to re-expand and displace the solid cake which continues to occupy the space between the sorber pad and the body. This action takes place whether the foreign material is in the form of a solid cake or individual lumps or solid particles.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a plug valve: a body including aligned inlet and outlet passages, said body being substantially resistant to deformation by line fluid pressures and shaped to deform essentially axially when subjected to sufficient pressure substantially axially of said passages and providing bendable shoulders; rigid seat rings in the body surrounding the respective passages and disposed adjacent said shoulders; a ported plug rotatably mounted and wholly supported on said seat rings on spherical zone surfaces; means for introducing a sealing and lubricating plastic under pressure between said surfaces to provide a fluid tight sealing film between said surfaces; and cooperating means between the back faces of said seat rings and said body shoulders for controllably outwardly transferring the thrust loads therebetween as the pressure of said plastic at either of said seating surfaces is increased beyond a predetermined amount to maintain rigidity of said seat rings during deformation of said body shoulders.

2. In a plug valve, a body having inlet and outlet passages, a ported plug within said body, rigid seat rings at opposite sides of the plug mounted for controlled axial shift in said body, said seat rings and plug having zones of spherical surface contact whereby the plug is effectively rotatably supported within the body only by said seat rings and adapted to be turned to interconnect or shut off fluid flow between said passages, means for introducing plastic sealing and lubricating material under pressure between said seating surfaces, and means coacting between the back of each seat ring and the adjacent body wall essentially concentrating normal operational thrust loads between each of the seat rings and the body wall at a region adjacent the inner periphery of said seat ring and transferring the thrust loads between each seat ring and body to a region adjacent the outer periphery of each seat ring when the lubricant pressure between said seating surfaces is increased sufficiently to result in deformation of the body wall.

3. In the plug valve defined in claim 2, annular internal body recesses surrounding the inlet and outlet passages for slidably mounting said seat rings and each recess providing a body shoulder having an axially directed face backing its adjacent seat ring, and each said seat ring having inner and outer hub structures adapted to bear on said faces, the outer of said hub structures being axially shorter than the inner to provide said thrust load transfer as said shoulders deform in response to increased lubricant pressure between said surfaces.

4. In a plug valve, a body having inlet and outlet passages, a ported plug rotatable within said body to interconnect or close said passages, seat rings having spherical zone surface contact with said plug supporting the plug within the body, said seat rings and plug being so mounted as to have limited axial movement together and separately within the body, means for introducing a sealing plastic film between said surfaces in any relative axial position of said plug and seat rings, and each said seat ring comprising a plug seating surface bearing section having annular sliding support with the body wall and a reduced diameter axially outer section projecting slidably into an annular recess surrounding the associated passage, said reduced diameter outer section having axial contact with said body and said seating surface bearing section normally having at least adjacent its outer periphery a small predetermined axial clearance with respect to said body wall and being adapted to engage said body wall upon flexure of said body wall.

5. In the plug valve defined in claim 4, said reduced diameter outer ring section being peripherally grooved, and a resilient O-ring seal in said groove compressed between the body and the seat ring.

6. In a plug valve wherein a ported plug is supported for rotation upon seat rings at opposite sides on spherical seating surface zones, and wherein said plug and seat rings are mounted for limited axial shift together or relatively within a valve body, the provision of recesses in the back faces of each seat ring facing the adjacent body wall backing the seat ring, and bodies of soft resilient sponge-like material partially filling said recesses.

7. A plug valve comprising: a body having inlet and outlet passages with internal annular recesses surrounding said passages and providing end wall abutments; a ported plug rotatable within said body to interconnect or close said passages; rigid seat rings having spherical zone surface contact with said plug and axially disposed in said internal recesses; said seat rings having back faces, disposed to face said end wall abutments of said recesses, including radially inner and outer axially disposed annular hubs; said inner annular hubs contacting radially inner abutments of respective recesses under static valve conditions and said outer annular hubs being spaced a slight distance from radially outer abutments in respective recesses; the portions of said body including said recesses being capable of resilient deformation in bending to permit an axial displacement of either or both of the radially inner abutments of the recesses relative to the radially outer abutments of said recesses when either or both of said seat rings are moved from seating engagement with said plug, said resilient deformation being limited by the distance that said outer hub is spaced from said recess end wall abutment; and lubricant jacking means for separating said seat rings from said ported plug at said spherical zone surface contact by axially shifting said seat rings and ported plug in opposite directions relative to said flow passages.

8. A plug valve comprising; a body having inlet and outlet passages with internal annular recesses surrounding said passages and providing end wall abutments; a ported plug rotatable within said body to interconnect or close said passages; rigid seat rings having spherical zone surface contact with said plug and axially disposed in said internal recesses; said seat rings having back faces, disposed to face said end wall abutments of said recesses, including radially inner and outer axially disposed annular hubs; said inner annular hubs contacting radially inner abutments of respective recesses under static valve conditions and said outer annular hubs being spaced a slight distance from radially outer abutments in respective recesses; the portions of said body including said recesses being capable of resilient deformation in bending to permit an axial displacement of either or both of the radially inner abutments of the recesses relative to the radially outer abutments of said recesses, when either or both of said seat rings are moved from seating engagement with said plug, said resilient deformation being limited by the distance that said outer hub is spaced from said recess end wall abutment; lubricant jacking means for separating said seat rings from said ported plug at said spherical zone surface contact by axially shifting said seat rings and ported plug in opposite directions relative to said flow passages; and an annular pad of resilient sponge-like material having a thickness dimension less than the axial dimension of said outer hubs, disposed on the back face of each seat ring between said inner and outer hubs.

9. In a ball valve, a body having a passage, a seat ring surounding the passage and mounted for movement axially of said passage, a ported ball plug mounted in said body and having substantially spherical seating surface engagement with said seat ring, means for introducing a plastic sealant under pressure into the space between said seating surfaces, a recess in the back of said seat ring facing said body, and a mass of resilient sponge-like material of sufficient volume for only partially filling said recess.

10. A lubricated plug valve assembly having two relatively separable parts between which line fluid may enter, said parts being a plug seat ring member and a supporting body member, means for applying plastic material under pressure against said seat ring member to move it toward said body member, one of said members having a surface recess facing the other of said members, and a shaped coherent mass of relatively soft resilient sponge-like material in said recess and only partially filling said recess, said mass being spaced from said other member and uncompressed at least when said pressure is not being exerted.

References Cited in the file of this patent

UNITED STATES PATENTS

| | | |
|---|---|---|
| 1,781,821 | Nordstrom | Nov. 18, 1930 |
| 1,992,738 | Carpenter | Feb. 26, 1935 |
| 2,333,424 | Humphreys | Nov. 2, 1943 |
| 2,651,490 | Clade | Sept. 8, 1953 |

FOREIGN PATENTS

| | | |
|---|---|---|
| 258,747 | Great Britain | Sept. 30, 1936 |